US012731882B2

(12) United States Patent
Tsuchiya

(10) Patent No.: US 12,731,882 B2
(45) Date of Patent: Sep. 8, 2026

(54) ANTENNA DEVICE WITH IMPROVED MOUNTING STRUCTURE

(71) Applicant: Yazaki Corporation, Tokyo (JP)

(72) Inventor: Kazuhiko Tsuchiya, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 183 days.

(21) Appl. No.: 18/342,849

(22) Filed: Jun. 28, 2023

(65) Prior Publication Data

US 2024/0006743 A1 Jan. 4, 2024

(30) Foreign Application Priority Data

Jul. 4, 2022 (JP) ................................ 2022-107721

(51) Int. Cl.
*H01Q 1/24* (2006.01)
*H01Q 1/12* (2006.01)
*H01Q 1/48* (2006.01)
*H01Q 9/42* (2006.01)

(52) U.S. Cl.
CPC ............... *H01Q 1/243* (2013.01); *H01Q 1/12* (2013.01); *H01Q 1/48* (2013.01); *H01Q 9/42* (2013.01)

(58) Field of Classification Search
CPC .......... H01Q 1/243; H01Q 1/48; H01Q 1/241; H01Q 5/307; H01Q 21/28; H01Q 9/42; H01Q 1/12; H01Q 1/32
See application file for complete search history.

(56) References Cited

U.S. PATENT DOCUMENTS

| | | | | | |
|---|---|---|---|---|---|
| 6,937,205 | B2 | 8/2005 | Chou et al. | | |
| 2004/0135733 | A1* | 7/2004 | Chou | H01Q 9/0421 | 343/702 |
| 2009/0303133 | A1* | 12/2009 | Ueki | H01Q 9/0421 | 343/700 MS |
| 2010/0309060 | A1* | 12/2010 | Harihara | H01Q 1/243 | 343/700 MS |
| 2014/0320363 | A1* | 10/2014 | Ng | H01Q 1/526 | 343/770 |

FOREIGN PATENT DOCUMENTS

| | | |
|---|---|---|
| JP | 2012-4678 A | 1/2012 |

* cited by examiner

*Primary Examiner* — Dameon E Levi
*Assistant Examiner* — Yonchan J Kim
(74) *Attorney, Agent, or Firm* — Sughrue Mion, PLLC

(57) ABSTRACT

An antenna element of an antenna device includes an antenna unit that is arranged at a position separated by a predetermined length in a first direction that is a direction perpendicular to a substrate surface of an antenna substrate from the substrate surface. Further, the antenna element includes a grounding unit that is connected continuous to the antenna unit and grounded to the antenna substrate. Further, the grounding unit is provided with a grounding body that is connected continuous to the antenna unit on one side in the first direction, and a mounting unit that is connected continuous to the other side of the grounding body in the first direction and mounted on the antenna substrate. Further, the mounting unit is provided with a plurality of mounting pieces that are spaced apart along a second direction intersecting the first direction.

1 Claim, 5 Drawing Sheets

ANTENNA DEVICE WITH IMPROVED MOUNTING STRUCTURE

CROSS-REFERENCE TO RELATED APPLICATIONS

The present application is based on, and claims priority from the prior Japanese Patent Application No. 2022-107721, filed on Jul. 4, 2022, the entire contents of which are incorporated herein by reference.

TECHNICAL FIELD

The present disclosure relates to an antenna device.

BACKGROUND

JP 2012-004678 A discloses an antenna device including an antenna element (a plate-like inverted-F antenna).

JP 2012-004678 A discloses that the antenna element includes an antenna unit (a plate-like radiating conductor) that is arranged opposite to an antenna substrate (a plate-like ground conductor). Further, the antenna element includes a grounding unit (a plate-like short-circuit unit) that connects one end of the antenna unit to the antenna substrate, and a plate-like feeding unit that extends from the antenna unit to the antenna substrate and feeds power to the antenna unit. By feeding power from the feeding unit to the antenna unit in a state in which the grounding unit is mounted on the antenna substrate, the antenna unit functions as an antenna in a desired frequency.

SUMMARY OF THE INVENTION

Incidentally, a grounding unit is generally connected to an antenna substrate by soldering the tip of the grounding unit to the antenna substrate (solder-mounting).

In addition, in an antenna element in which the antenna unit functions as an antenna in a desired frequency as in the prior technology described above, the grounding unit may need to have a certain width in order to secure a desired frequency band. When the grounding unit has a certain width in order to secure a desired frequency band, heat tends to diffuse over the whole antenna element.

Accordingly, when a grounding unit is mounted on the antenna substrate by soldering in a case where the grounding unit has a certain width, the heat of the solder may diffuse over a wide area of the antenna element, which may increase the time that is required to mount the grounding unit on the antenna substrate.

Thus, in the above prior technology, it has been difficult to provide a grounding unit having a certain width and reduce the time that is required to mount the grounding unit on the antenna substrate in order to secure a desired frequency band. In other words, it has been difficult to obtain the desired antenna characteristics in the antenna unit and easily mount the grounding unit on the antenna substrate.

An object of the present disclosure is to provide an antenna device with which it is possible to obtain the desired antenna characteristics in an antenna unit and mount a grounding unit on an antenna substrate more easily.

An antenna device according to an embodiment includes an antenna substrate and an antenna element that is connected to the antenna substrate. The antenna element includes: an antenna unit that is arranged at a position separated by a predetermined length from a substrate surface of the antenna substrate in a first direction that is a direction perpendicular to the substrate surface of the antenna substrate, in such a way as to be parallel to the substrate surface of the antenna substrate; a grounding unit that is connected continuous to the antenna unit and grounded to the antenna substrate; and a feeding unit that is connected continuous to the antenna unit and feeds power to the antenna unit. The grounding unit is provided with a grounding body that is connected continuous to the antenna unit on one side in the first direction, and a mounting unit that is connected continuous to another side of the grounding body in the first direction and mounted on the antenna substrate, and the mounting unit is provided with a plurality of mounting pieces that are spaced apart along a second direction intersecting the first direction.

The above configuration can provide an antenna device with which it is possible to obtain the desired antenna characteristics in an antenna unit and mount a grounding unit on an antenna substrate more easily.

DETAILED DESCRIPTION OF THE INVENTION

Figure 1:
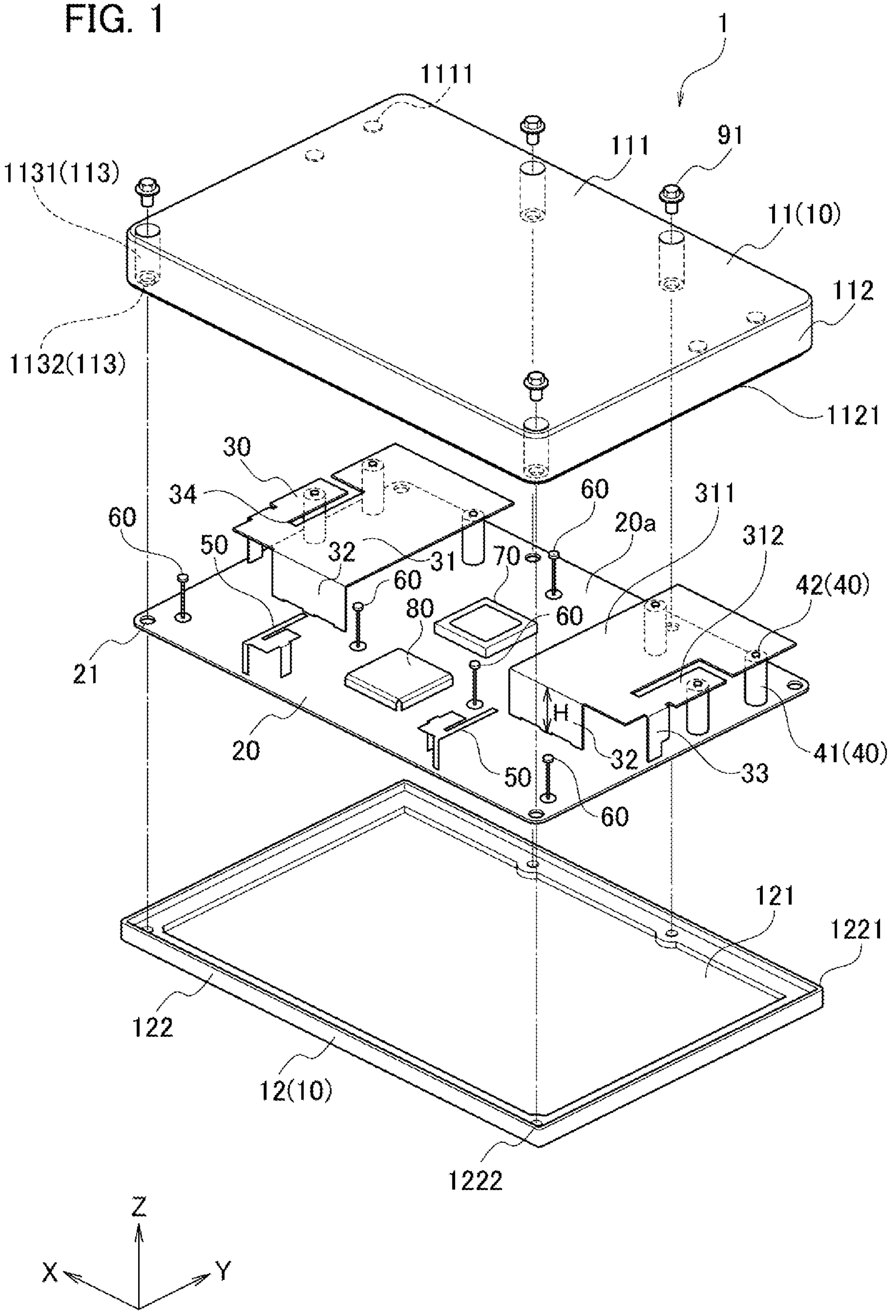
FIG. 1 is an exploded perspective view illustrating an example of an antenna device according to an embodiment.

Various embodiments will be described hereinafter with reference to the accompanying drawings.

Hereafter, an antenna device according to the present embodiment will be described in detail with reference to the drawings. Note that the dimensional ratios in the drawings are exaggerated for convenience of the explanation and may differ from the actual ratios.

In the following, an example of an in-vehicle antenna device installed in a vehicle as an antenna device will be described by defining the longitudinal direction of the antenna device as the X-direction, the lateral direction of the antenna device as the Y-direction, and the thickness direction of the antenna device as the Z-direction. In addition, the antenna device with be described in a state in which the antenna device is arranged such that a circuit substrate (antenna substrate) is positioned downward and an antenna unit is positioned upward, with the thickness direction (Z-direction) of the antenna device being defined as the up-down direction.

An in-vehicle antenna device (antenna device) 1 according to the present embodiment may be, for example, a device that notifies a call center outside a vehicle of the condition and position information of the vehicle when an abnormality occurs in the vehicle, and that also makes it possible to make an emergency call to the call center.

Figure 2:
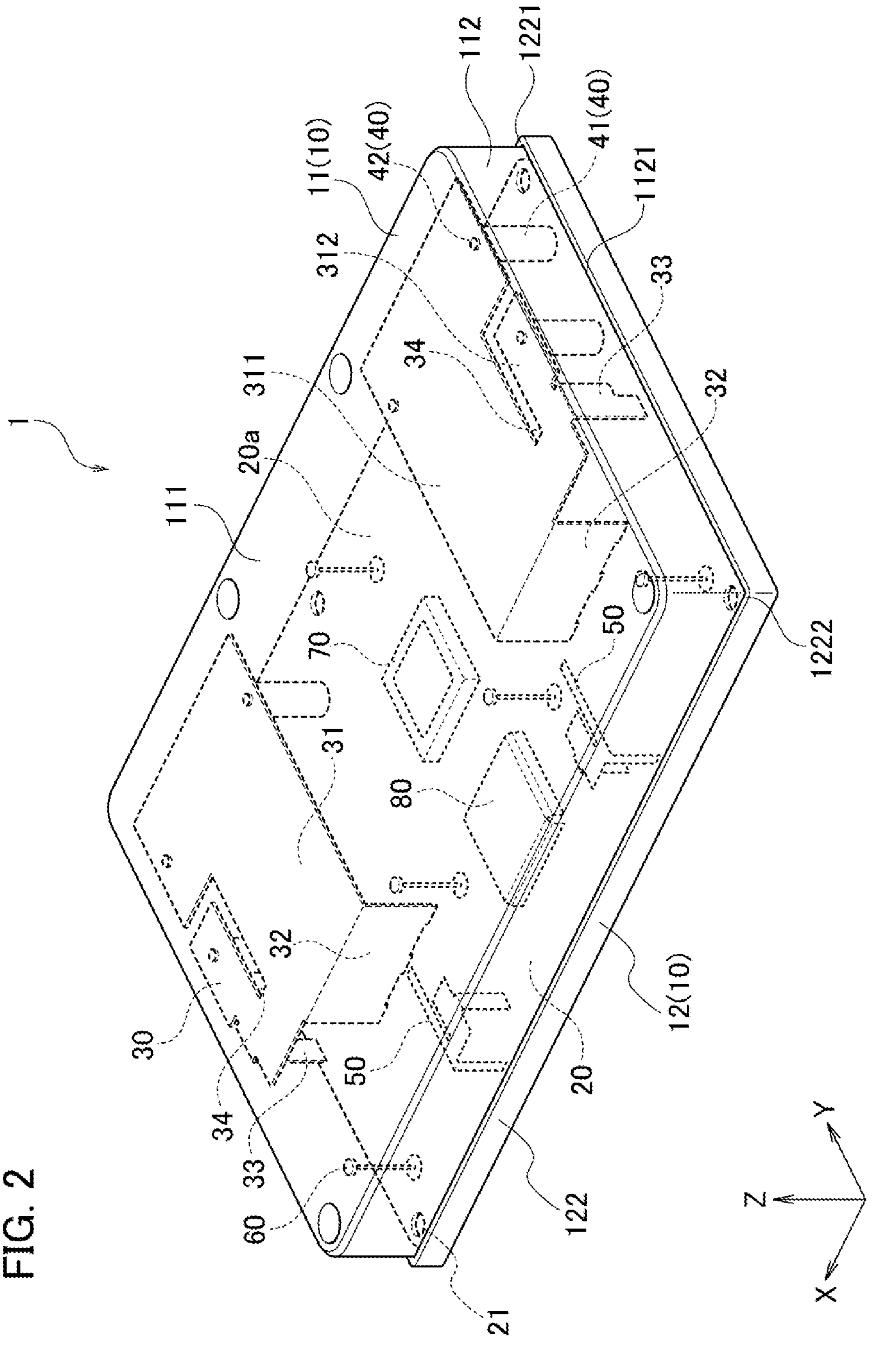
FIG. 2 is a perspective view illustrating an example of the antenna device according to the embodiment.

In the present embodiment, the in-vehicle antenna device 1 includes a circuit substrate (antenna substrate) 20 and an antenna element 30 that is connected to the circuit substrate 20, as illustrated in FIGS. 1 and 2. The 10 antenna device 1 also includes a housing in which the circuit substrate 20 and a pair of antenna element 30 are housed.

Further, in the present embodiment, a pair of second antenna elements 50, five pole antennas 60, one GPS antenna 70, and one amplifier circuit 80 are housed inside the housing 10.

The housing 10 is approximately rectangular in shape, and includes a resin upper case (first case) 11 and a metal lower case (second case) 12. The upper case 11 is provided with an approximately rectangular plate-shaped top wall 111 and a peripheral wall 112 extending downward from the outer peripheral edge of the top wall 111. The lower case 12 is provided with an approximately rectangular plate-shaped bottom wall 121 and a peripheral wall 122 extending upward from the outer peripheral edge of the bottom wall 121.

By fixing the upper case 11 and the lower case 12 to each other, the housing 10 is formed having a space formed therein. In the present embodiment, a lower end 1121 of the peripheral wall 112 of the upper case 11 is formed only on the inner peripheral side, and an upper end 1221 of the peripheral wall 122 of the lower case 12 is formed only on the outer peripheral side. Thus, when the upper case 11 and the lower case 12 are fixed to each other, the lower end 1121 of the peripheral wall 112 of the upper case 11 is fitted into the upper end 1221 of the peripheral wall 122 of the lower case 12.

Further, in the present embodiment, screws 91 are used to fix the upper case 11 and the lower case 12. More specifically, fixing parts 113 fixed by the screws 91 are formed at the outer peripheral edges of the top wall 111 of the upper case 11. In the present embodiment, the fixing parts 113 are formed by housing recesses 1131 in which the screws 91 are housed and insertion holes 1132 formed at the lower ends of the housing recesses 1131 so as to penetrate in the Z-direction (up-down direction: a first direction).

Further, screw-fixing recesses 1222 are formed at positions, which are opposite to the insertion holes 1132, in the outer peripheral edges of the bottom wall 121 of the lower case 12. The screws 91 are inserted into the insertion holes 1132 and screwed into the screw-fixing recesses 1222, and thus the upper case 11 and the lower case 12 are fixed to each other by the screws 91.

When the housing 10 is formed by fixing the upper case 11 and the lower case 12, the circuit substrate 20 to which the antenna element 30 is electrically connected is housed inside the housing 10. In the present embodiment, the circuit substrate 20 is housed inside the housing 10 in a state in which the components such as the antenna elements 30 are positioned on the upper side. In the present embodiment, the pair of antenna elements 30, the pair of second antenna elements 50, the five pole antennas 60, the one GPS antenna 70, and the one amplifier circuit 80 correspond to the components such as the antenna elements 30.

Further, in the present embodiment, insertion holes 21 are formed at positions, which are opposite to the insertion holes 1132 and the screw-fixing recesses 1222, in the circuit substrate 20. When the upper case 11 and the lower case 12 are fixed to each other by the screws 91, the circuit substrate 20 is also configured to be fixed by the screws 91. This suppresses movement of the circuit substrate 20 within the housing 10 relative to the housing 10.

The circuit substrate 20 has an approximately rectangular plate shape, and the components such as the antenna elements 30 are electrically connected to a surface 20*a* of the circuit substrate 20 (substrate surface). An amplifier circuit, an electrolytic capacitor, or the like may be mounted on the circuit substrate 20, depending on the intended use of the in-vehicle antenna device 1.

The antenna element 30 has an antenna unit 31 and functions as a plate-like inverted-F antenna. In the present embodiment, the antenna unit 31 is arranged at a position separated by a predetermined length H from the surface 20*a* in the first direction (up-down direction: Z-direction), in such a way as to be parallel to the surface 20*a* of the circuit substrate 20. Specifically, a portion extending in the first direction (up-down direction: Z-direction) is provided at a peripheral part of the antenna unit 31, and the portion extending in the first direction (up-down direction: Z-direction) is fixed (mounted) to the circuit substrate 20 by soldering. Thus, the antenna unit 31 is arranged at the position separated by the predetermined length H from the surface 20*a* in the first direction (up-down direction: Z-direction), in such a way as to be parallel to the surface 20*a* of the circuit substrate 20.

Further, in the present embodiment, the portion extending in the first direction (up-down direction: Z-direction) is electrically connected to the circuit substrate 20, which causes the portion to function as a grounding unit 32 and a feeding unit 33. Specifically, the portion extending in the X-direction and the Z-direction is electrically connected to a ground pattern of the circuit substrate 20, which causes the portion to function as the grounding unit 32. In addition, the portion extending in the Y-direction and the Z-direction is electrically connected to a feeding pattern of the circuit substrate 20, which causes the portion to function as the feeding unit 33.

Thus, in the present embodiment, the antenna element 30 has the antenna unit 31, the grounding unit 32 that is connected continuous to the antenna unit 31 and electrically connected to the circuit substrate 20, and the feeding unit 33 that is connected continuous to the antenna unit 31 and electrically connected to the circuit substrate 20. In other words, the antenna element 30 has the antenna unit 31, the grounding unit 32 that is connected continuous to the antenna unit 31 and grounded to the circuit substrate 20, and the feeding unit 33 that is connected continuous to the antenna unit 31 and feeds power to the antenna unit 31.

In addition, an approximately L-shaped slit 34 is formed in the antenna unit 31, and thus the antenna unit 31 is divided into a plurality of areas. The plurality of areas function as antenna elements having different frequency bands. Accordingly, the in-vehicle antenna device 1 can communicate in multiple frequency bands. In the present embodiment, the antenna unit 31 is provided with a first antenna element 311 resonating in the 800 MHz band and a second antenna element 312 resonating in the 2 GHz band.

The antenna element 30 having such a shape can be formed, for example, by punching out a single metal plate by means of pressing, or by bending a single metal plate at an almost right angle.

Further, in the present embodiment, the antenna device 1 includes the pair of antenna elements 30, and the pair of antenna elements 30 are arranged so as to be linearly symmetric with respect to a straight line extending in the Y-direction.

The pair of antenna elements 30 arranged in this way can be used, for example, as a TEL antenna to realize communication with a call center (network server) providing emergency call services via a mobile phone communication network.

When the pair of antenna elements 30 are used as a TEL antenna, the predetermined length H indicating the distance between the antenna unit 31 and the circuit substrate 20 can be determined by the following method, for example. That is, the predetermined length H can be determined by optimizing the length on the basis of the relationship between the wavelength of the frequency band corresponding to each antenna element and the peripheral components affecting each antenna element.

Further, in the present embodiment, a holder 40 is arranged between the circuit substrate 20 and the antenna unit 31, and the holder 40 allows the antenna unit 31 to maintain the distance between the antenna unit 31 and the surface 20*a* of the circuit substrate 20 at the predetermined length H. The holder 40 is made of resin with electrical insulating properties such that the influence on the antenna characteristics of the antenna unit 31 becomes relatively small. In this case, it is preferable to form the holder 40 using a resin material with a low dielectric constant, or a resin material with a low dielectric tangent.

In the present embodiment, as illustrated in FIGS. 1 and 2, the holder 40 includes an approximately cylindrical main body 41 that is elongated in the first direction (up-down direction: Z-direction) that is perpendicular to the substrate surface 20*a* of the circuit substrate 20. Accordingly, by using the columnar holder 40 that is elongated in the first direction (up-down direction: Z-direction), the influence on the antenna characteristics of the antenna device 1 that is caused by the holder 40 can be reduced as much as possible. Incidentally, it is not necessary for the holder 40 to have a cylindrical shape. For example, the holder 40 may have various types of shapes, such as a quadrilateral shape.

At the upper end of the main body 41, a fitting protrusion 42 smaller in diameter than the main body 41 is formed to protrude upward. In addition, the antenna unit 31 is formed with a fitting hole 31*a* into which the fitting protrusion 42 is fitted. By fitting the fitting protrusion 42 of the holder 40 into the fitting hole 31*a*, movement of the antenna unit 31 in the XY plane that is orthogonal to the up-down direction (deviation in the horizontal direction) can be suppressed.

Further, in the present embodiment, in a state in which the antenna element 30 is housed in the housing 10, a tip surface of the fitting protrusion 42 penetrates into the fitting hole 31*a* to abut on the inner surface of the upper case 11. That is, the antenna unit 31 is sandwiched between the holder 40 and the upper case 11. This makes it possible to suppress movement of the antenna unit 31 in the up-down direction (deviation in the up-down direction) due to vibrations or the like.

Since movement of the antenna unit 31 in the XY plane and in the up-down direction is suppressed as described above, the antenna device 1 is configured to withstand vibrations when mounted in a vehicle.

At the lower end of the main body 41, a fitting protrusion (not illustrated) smaller in diameter than the main body 41 is formed to protrude downward, and the circuit substrate is formed with an insertion hole (not illustrated) into which the fitting projection is fitted. In a state in which the fitting protrusion is fitted into the insertion hole, the holder 40 is fixed to the circuit substrate 20 by a resin screw, for example.

Further, in the present embodiment, on the top wall 111 of the upper case 11, a circular protrusion 1111 that protrudes downward is provided at the portion abutting on the tip surface of the fitting protrusion 42. A lower surface of the circular protrusion 1111 (inner surface of the upper case 11) is configured to abut on the tip surface of the fitting protrusion 42. As a result, a gap is formed between the top wall 111 and a portion of the antenna unit 31 where the holder 40 is not arranged, and this gap makes it possible to reduce the influence of the top wall 111 on the antenna characteristics of the antenna device 1 as much as possible.

Further, in the present embodiment, the holder 40 is arranged in the peripheral part of the antenna unit 31. Specifically, three holders 40 are arranged separated from each other along the peripheral part of each antenna unit 31. At this time, the portions of the antenna unit 31 that are relatively easy to displace in the up-down direction are held by these three holders 40. That is, the fitting protrusions 42 of these three holders 40 are fitted into the portions of the antenna unit 31 that are relatively easy to displace in the up-down direction.

This makes it possible to more reliably suppress displacement of the antenna unit 31 in the up-down direction and reduce the influence of the holder 40 on the antenna characteristics of the antenna device 1 as much as possible. In addition, this makes it possible to more reliably suppress degradation in the antenna characteristics of the antenna device 1.

The pair of second antenna elements 50 may be, for example, antennas (plate-like inverted-F antennas) for receiving wavelengths of high-frequency bands that are different from the 800 MHz band or 2 GHz band. The pair of second antenna elements 50 are also electrically connected to the circuit substrate 20 (mounted by soldering). In the present embodiment, the pair of second antenna elements 50 are also arranged on the circuit substrate so as to be linearly symmetric with respect to a straight line extending in the Y-direction.

In addition, the five pole antennas 60 may be antennas for receiving wavelengths in high frequency bands that are different from the antenna element 30 and the second antenna element 50, for example. These five pole antennas 60 are also electrically connected (mounted by soldering) to the circuit substrate 20.

In addition, the GPS antenna 70 is an antenna for receiving signals with time information from a plurality of positioning satellites, and the GPS antenna 70 is also electrically connected to the circuit substrate 20 (mounted by soldering). Using such a GPS antenna 70 makes it possible to calculate the position or the direction of velocity, and acquire the time with high precision, thereby making it possible to measure the current position of a vehicle on the ground.

In addition, the amplifier circuit 80 has a function of amplifying signals received by the GPS antenna 70, and the amplifier circuit 80 is also electrically connected to the circuit substrate 20 (mounted by soldering).

Such an in-vehicle antenna device (antenna device) 1 is used, for example, by being mounted on a ground plate that is 500 mm×500 mm (not illustrated). Specifically, the in-vehicle antenna device 1 is mounted on a ground plate, and in a state in which the grounding unit 32 is mounted on the circuit substrate 20, the feeding unit 33 feeds power to the antenna unit 31, and thus the antenna unit 31 functions as an antenna resonating in two bands (800 MHz band and 2 GHz band). At this time, each of the second antenna elements 50, the pole antennas 60, and the GPS antenna 70 acts as an antenna in a desired frequency to drive the amplifier circuit 80.

This allows the in-vehicle antenna device (antenna device) 1 to function as a composite antenna device that is composed of a plurality of antennas compatible with different communication methods.

In the present embodiment, the grounding unit 32 of the antenna element 30 is a portion that is connected continuous to the first antenna element 311 resonating in the 800 MHz band in such a way as to extend in the X-direction and Z-direction and is electrically connected to the circuit substrate 20.

At this time, in order to cause the first antenna element 311 to resonate in the desired frequency band (800 MHz band), the width of the grounding unit 32 (length in the X-direction) that is connected continuous to the first antenna element 311 needs to be a certain size or larger. In the present embodiment, the grounding unit 32 is configured to have a width ranging from the inner end of the antenna unit 31 in the X-direction to the vicinity of the slit 34, and the grounding unit 32 when viewed along the Y-direction has a rectangular shape that is wide in the X-direction.

When the grounding unit 32 that is wide in the X-direction is provided as described above, it is possible for the frequency band acting on the antenna unit 31 to be a desired frequency band (800 MHz band). However, when the grounding unit 32 that is wide in the X-direction is mounted on the circuit substrate 20 by soldering, the heat of the solder diffuses over a wide area of the antenna element 30, which may increase the time that is required to mount the grounding unit 32 on the circuit substrate 20.

In contrast, when the grounding unit 32 is reduced in width (length in the X-direction) in order to reduce the time that is required to mount the grounding unit 32 on the circuit substrate 20, the first antenna element 311 is not able to resonate in the desired frequency band (800 MHz band).

Accordingly, when the grounding unit 32 is simply formed to be wide and the lower end of the grounding unit 32 is merely mounted on the circuit substrate 20 by soldering, it has been difficult to obtain the desired antenna characteristics in the antenna unit 31 and mount the grounding unit 32 on the circuit substrate 20 easily.

Therefore, the present embodiment makes it possible to obtain the desired antenna characteristics in the antenna unit 31 and mount the grounding unit 32 on the circuit substrate 20 more easily.

Specifically, the grounding unit 32 is provided with a grounding body 321 that is connected continuous to the antenna unit 31 on one side in the first direction (upper side in the up-down direction), and a mounting unit 322 that is connected continuous to the other side of the grounding body 321 in the first direction (lower side in the up-down direction) and mounted on the circuit substrate 20.

The mounting unit 322 is configured to have a three-pronged shape. That is, the mounting unit 322 is provided with three (plural) mounting pieces 3221 that are spaced apart along the second direction intersecting the first direction (the longitudinal direction of the antenna device: the X-direction). In the present embodiment, the three mounting pieces 3221 are connected continuous to the lower end of the grounding body 321 in a state in which the three mounting pieces 3221 are spaced apart at a predetermined pitch in the X-direction. Further, in the present embodiment, the three mounting pieces 3221 are formed at both ends in the X-direction and at the central part in the X-direction, and thus the grounding unit 32 has a shape that is symmetrical when viewed along the Y-direction.

Each of the three mounting pieces 3221 is fixed to the circuit substrate 20 by soldering, and thus the grounding unit 32 is mounted on the circuit substrate 20. That is, each of the mounting pieces 3221 that is connected continuous to the lower end of the grounding body 321 and spaced apart along the X-direction is mounted on the circuit substrate (antenna substrate) 20.

Accordingly, when the grounding unit 32 is mounted on the circuit substrate 20 by soldering, diffusion of the heat of the solder over the whole antenna element 30 can be suppressed, thereby making it possible to reduce the time that is required to mount the grounding unit 32 on the circuit substrate 20. This makes it possible to mount the grounding unit 32 on the circuit substrate (antenna substrate) 20 more easily.

At this time, since the three mounting pieces 3221 that are connected continuous to the lower end of the grounding body 321 are mounted on the circuit substrate 20, it is possible to reduce the influence of the grounding unit 32 that is caused by a change in shape of the grounding unit 32 on the antenna characteristics of the antenna unit 31 (in particular, the first antenna element 311). That is, it is possible to suppress the antenna characteristics of the antenna unit 31 (in particular, the first antenna element 311) from degrading as much as possible.

Therefore, the antenna device 1 according to the present embodiment makes it possible to obtain the desired antenna characteristics in the antenna unit 31 and mount the grounding unit 32 on the circuit substrate 20 more easily.

Further, when the three mounting pieces 3221 are formed at both ends in the X-direction and at the central part in the X-direction and when the grounding unit 32 has a shape that is symmetrical when viewed along the Y-direction, it is possible to mount the lower end of the grounding unit 32 on the circuit substrate 20 more firmly and in a balanced manner.

Figure 3:
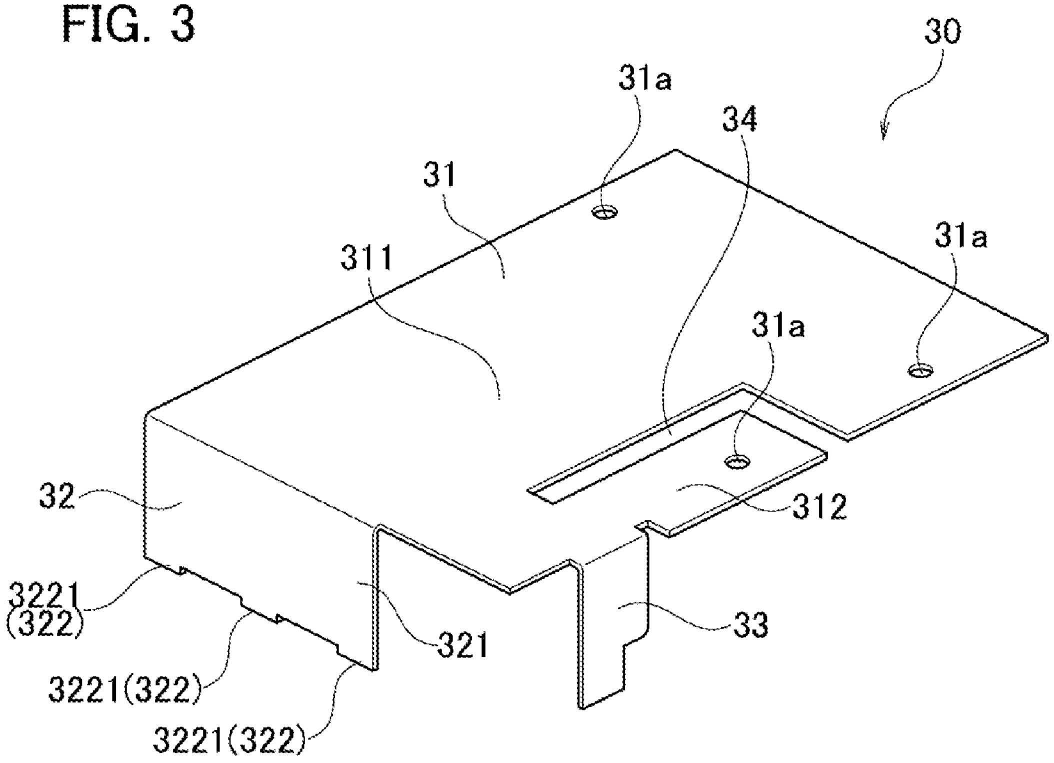
FIG. 3 is a perspective view illustrating an example of an antenna element that is provided in the antenna device according to the embodiment.

Incidentally, each of the pair of antenna elements 30 need not have the shape illustrated in FIG. 3, and may be configured in various shapes. For example, each of the pair of antenna elements 30 may have the shape illustrated in FIG. 4.

Figure 4:
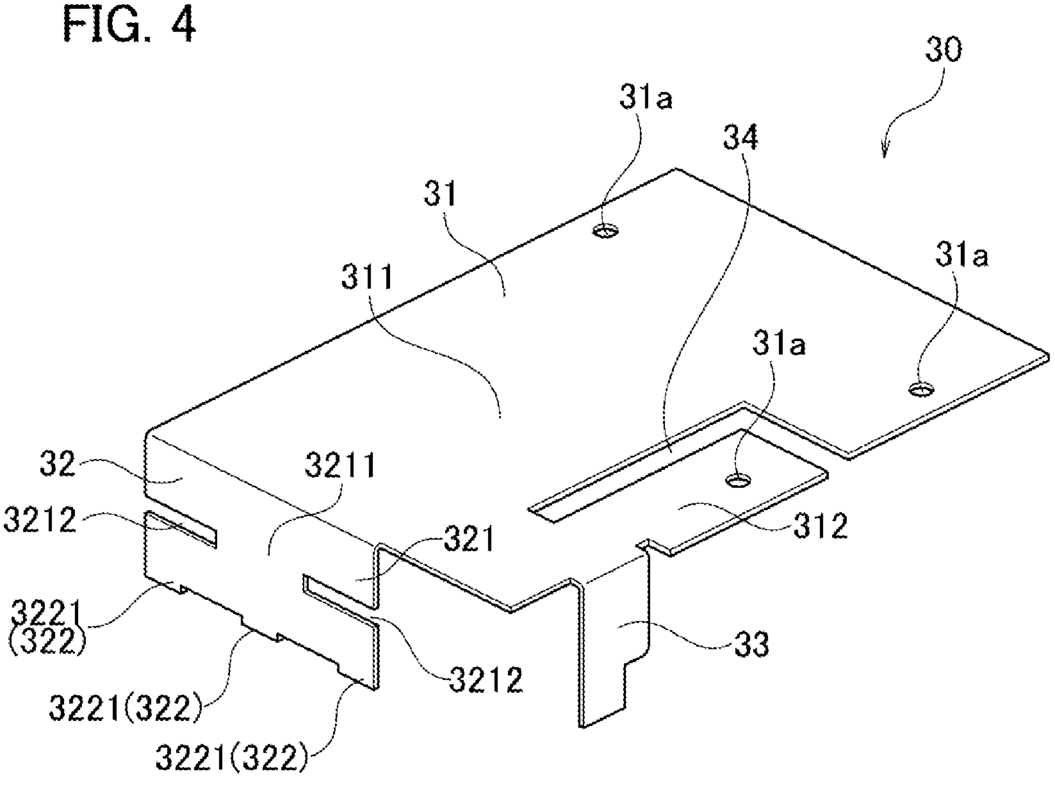
FIG. 4 is a perspective view illustrating another example of an antenna element that is provided in the antenna device according to the embodiment.

Specifically, even in the antenna element 30 illustrated in FIG. 4, the grounding unit 32 is provided with the grounding body 321 that is connected continuous to the antenna unit 31 on the upper side in the up-down direction, and the mounting unit 322 that is connected continuous to the lower side in the up-down direction of the grounding body 321 and mounted on the circuit substrate 20. In addition, the mounting unit 322 is configured to have a three-pronged shape.

In the antenna element 30 illustrated in FIG. 4, a narrow part 3211 having a short length in the second direction (the longitudinal direction of the antenna device: the X-direction) is formed in a portion of the grounding body 321 in the first direction (the up-down direction: the Z-direction).

This makes it possible, when the grounding unit 32 is mounted on the circuit substrate 20 by soldering, to suppress transfer of the heat of the solder to the antenna unit 31, and further reduce the time that is required to mount the grounding unit 32 on the circuit substrate 20.

In the present embodiment, the narrow part 3211 is formed by forming slits 3212 extending in the second direction (the longitudinal direction of the antenna device: the X-direction) in a portion of the grounding body 321 in the first direction (the up-down direction: the Z-direction).

Specifically, the narrow part 3211 is formed in the central part in the X-direction by forming the slits 3212 on both sides in the X-direction in the approximately central part of the grounding body 321 in the up-down direction. In addition, the slits 3212 are open to the outer side in the X-direction and have an approximately rectangular shape when viewed along the Y-direction. This allows the grounding unit 32 to have a shape that is symmetrical when viewed along the Y-direction, even in the antenna element 30 illustrated in FIG. 4.

Thus, when the narrow part 3211 is formed in a portion of the grounding body 321 in the up-down direction by forming the slits 3212 in the grounding body 321, it is possible to suppress diffusion of the heat of the solder over the whole antenna element 30.

However, the slits 3212 are formed in the grounding body 321, which affect the antenna characteristics of the antenna unit 31. This can be confirmed from the measurement results of the VSWR characteristics illustrated in FIG. 5 to FIG. 8.

FIG. 5 to FIG. 8 are graphs illustrating the frequency characteristics of the voltage standing wave ratios (VSWR) of the in-vehicle antenna device 1.

Figure 5:
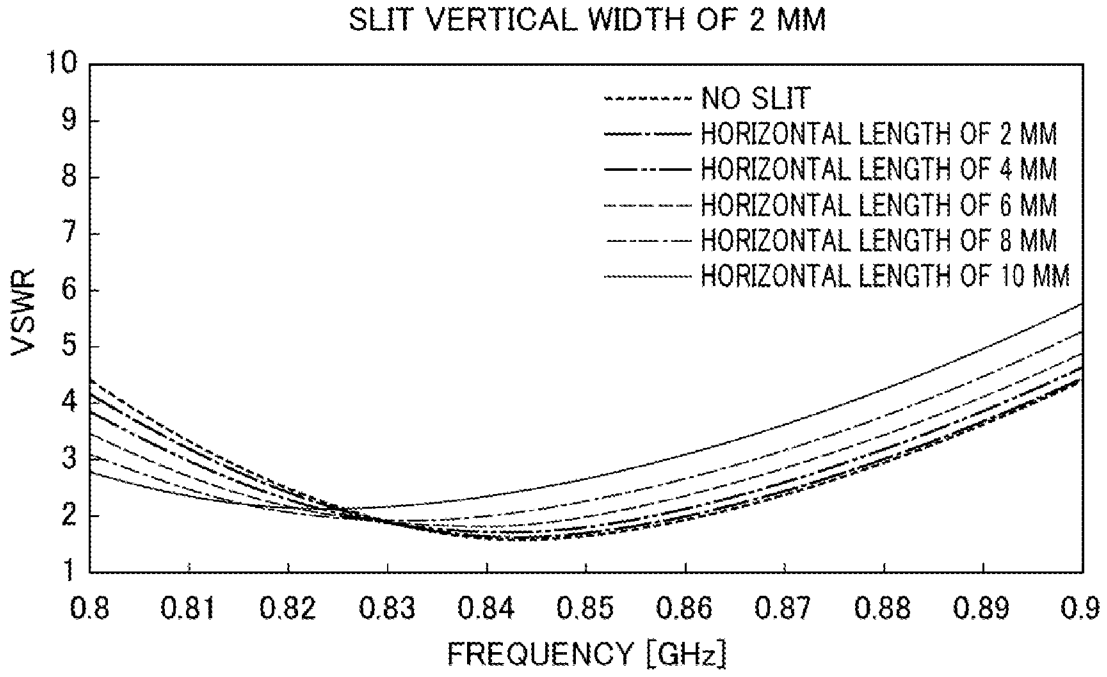
FIG. 5 is a graph illustrating the frequency characteristics of voltage standing wave ratios when the vertical widths of slits are fixed to a constant value and when the horizontal lengths of slits change, and a graph illustrating the frequency characteristics of voltage standing wave ratios in the 800 MHz band.

Specifically, FIG. 5 illustrates the respective measurement results of the VSWR characteristics in the 800 MHz band acquired when the slits are not provided and when each of the slits 3212 provided on the left and right has a fixed vertical width of 2 mm and has a horizontal length of 2 mm, 4 mm, 6 mm, 8 mm, and 10 mm.

Figure 6:
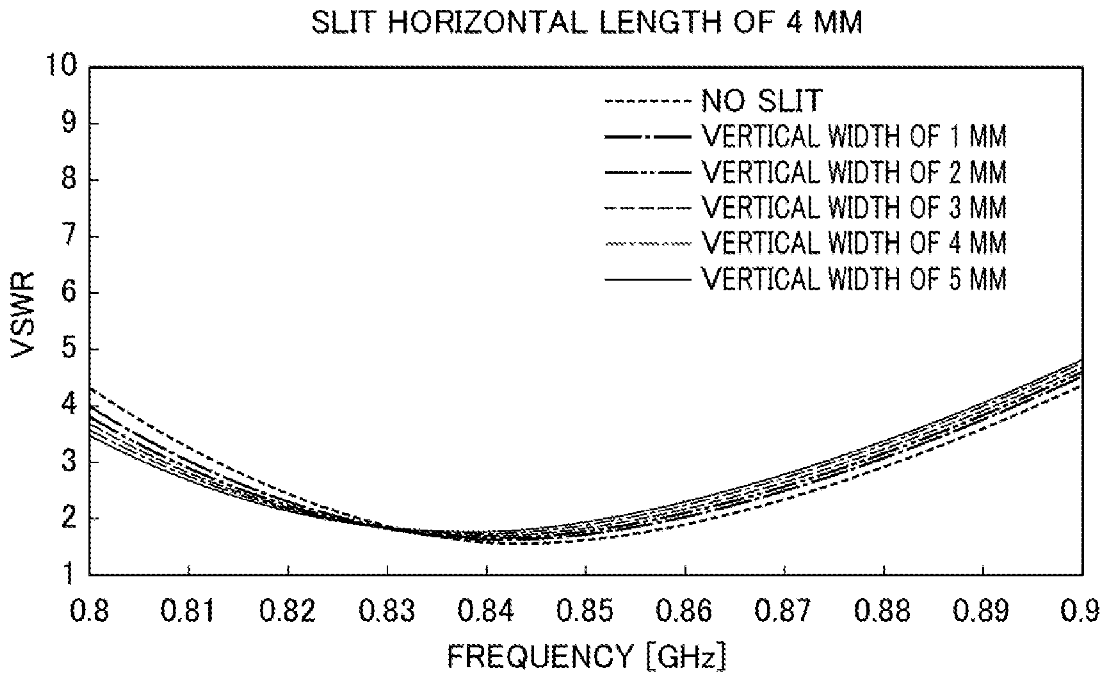
FIG. 6 is a graph illustrating the frequency characteristics of voltage standing wave ratios when the horizontal lengths of slits are fixed to at a constant value and when the vertical widths of slits change, and a graph illustrating the frequency characteristics of voltage standing wave ratios in the 800 MHz band.

In addition, FIG. 6 illustrates the respective measurement results of the VSWR characteristics in the 800 MHz band acquired when the slits are not provided and when each of the slits 3212 provided on the left and right has a fixed horizontal length of 4 mm and has a vertical width of 1 mm, 2 mm, 3 mm, 4 mm, and 5 mm.

Figure 7:
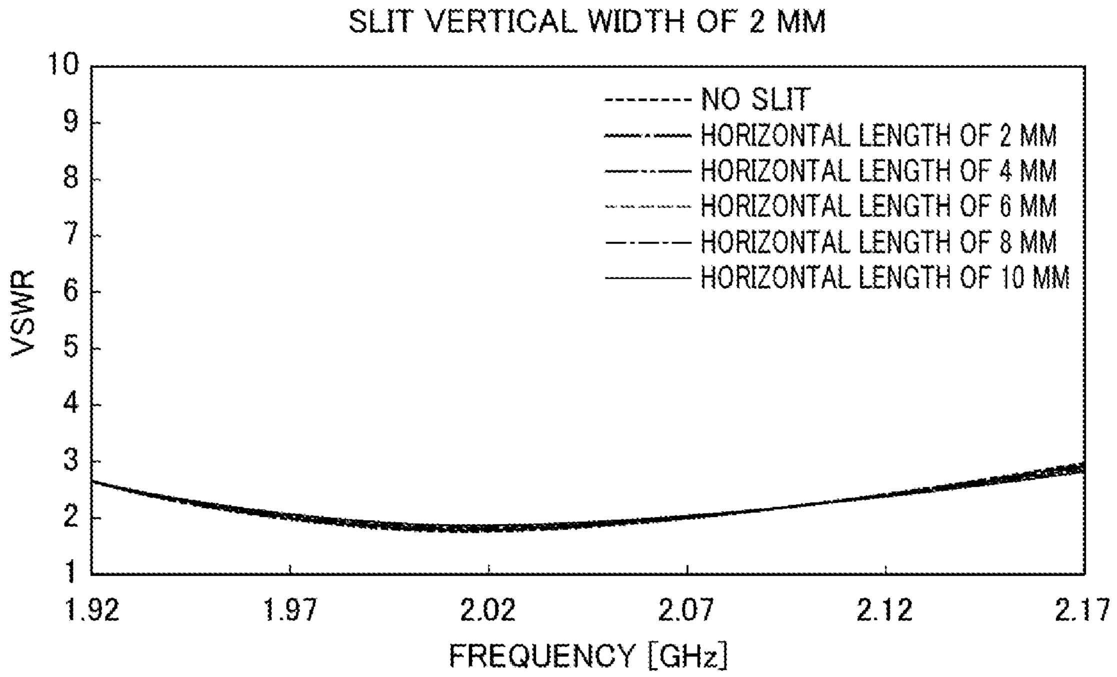
FIG. 7 is a graph illustrating the frequency characteristics of voltage standing wave ratios when the vertical widths of slits are fixed to a constant value and when the horizontal lengths of slits change, and a graph illustrating the frequency characteristics of voltage standing wave ratios in the 2 GHz band.

In addition, FIG. 7 illustrates the respective measurement results of the VSWR characteristics in the 2 GHz band acquired when the slits are not provided and when each of the slits 3212 provided on the left and right has a fixed vertical width of 2 mm and has a horizontal length of 2 mm, 4 mm, 6 mm, 8 mm, and 10 mm.

Figure 8:
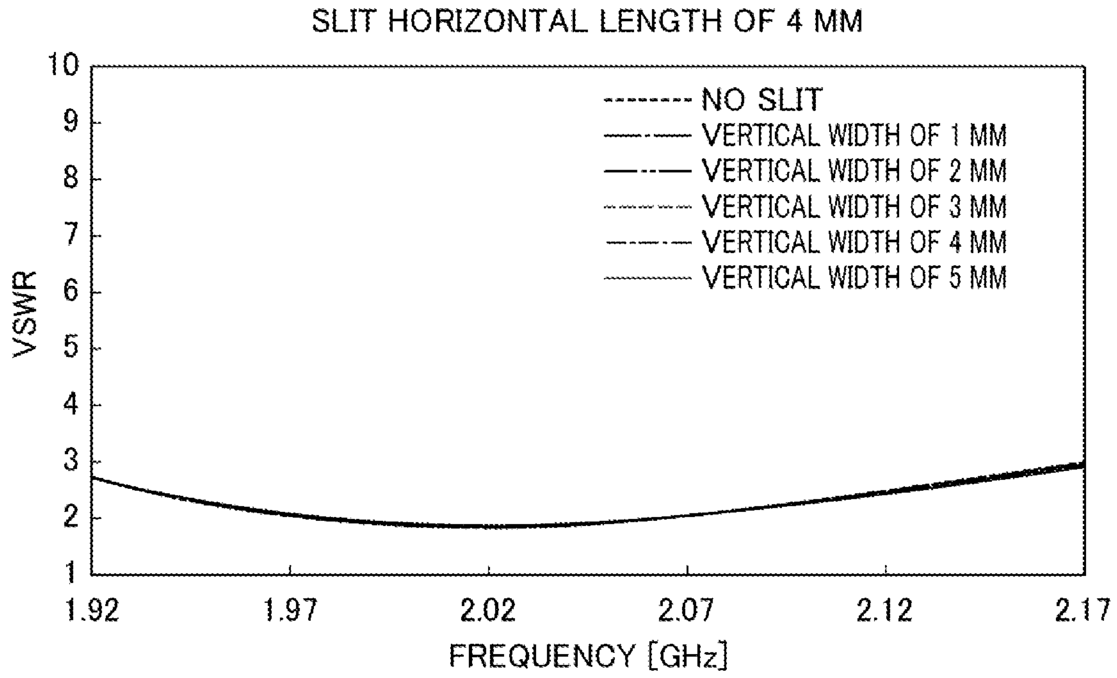
FIG. 8 is a graph illustrating the frequency characteristics of voltage standing wave ratios when the horizontal lengths of slits are fixed to a constant value and when the vertical widths of slits change, and a graph illustrating the frequency characteristics of voltage standing wave ratios in the 2 GHz band.

In addition, FIG. 8 illustrates the respective measurement results of the VSWR characteristics in the 2 GHz band acquired when the slits are not provided and when each of the slits 3212 provided on the left and right has a fixed horizontal length of 4 mm and has a vertical width of 1 mm, 2 mm, 3 mm, 4 mm, and 5 mm.

From the graphs illustrated in FIG. 5 and FIG. 6, it can be confirmed that the antenna performance of the first antenna element 311 resonating in the 800 MHz band differs depending on the size of the slits 3212 formed in the grounding body 321. In contrast, from the graphs illustrated in FIG. 7 and FIG. 8, it can be confirmed that even if the slits 3212 formed in the grounding body 321 change in size, the antenna performance of the second antenna element 312 resonating in the 2 GHz band hardly changes. For this reason, it can be confirmed that the grounding unit 32 operates mainly in the 800 MHz band and hardly in the 2 GHz band in the present embodiment.

In addition, from the graphs illustrated in FIG. 5 and FIG. 6, it can also be confirmed that the resonance of the first antenna element 311 decreases in frequency when the vertical width and the horizontal length of the slits 3212 increase. It is thought that such a phenomenon (the resonance of the first antenna element 311 decreasing in frequency) occurs because the path length flowing along the slits 3212 appears to increase when the slits 3212 of the grounding unit 32 increase in size.

For this reason, when the slits 3212 are formed in the grounding body 321 as in the antenna element 30 illustrated in FIG. 4, it is preferable to adjust the size of the slits 3212 in a range in which the first antenna element 311 can resonate in the desired frequency band.

For example, when the resonance frequency of the first antenna element 311 in a state in which no slit is formed is within the desired frequency band, it is preferable to adjust the size of the slits 3212 in a range in which the frequency characteristics are not affected. That is, it is preferable to adjust the size of the slits 3212 such that the resonance frequency of the first antenna element 311 is within the desired frequency band.

When the resonance frequency of the first antenna element 311 in a state in which no slit is formed is higher than the desired frequency band, the resonance frequency of the first antenna element 311 is caused to decrease by forming the slits 3212, thereby making it possible to adjust the size of the slits 3212.

This makes it possible to suppress diffusion of the heat of soldering performed when connecting the antenna element 30 to the circuit substrate 20, without degrading the antenna characteristics of the antenna unit 31 (in particular, the first antenna element 311).

As described above, in the antenna element 30 illustrated in FIG. 4, the narrow part 3211 is formed by forming the slits 3212 extending in the X-direction in a portion of the grounding body 321 in the up-down direction. This makes it possible to adjust the antenna characteristics of the antenna unit 31 and the time that is required for solder mounting simply by adjusting the size of the slits 3212 (the vertical width and horizontal length). That is, this makes it possible to more easily adjust the antenna characteristics of the antenna unit 31 and the time that is required to mount the grounding unit 32 on the circuit substrate 20 by soldering. As a result, it becomes possible to easily manufacture the antenna device 1 with which it is possible to obtain the desired antenna characteristics in the antenna unit and reduce the time that is required to mount the grounding unit 32 on the circuit board (antenna substrate) 20.

[Function and Effect]

In the following description, the characteristic configuration of the antenna device described in the above embodiment and in the modified example thereof, and the effect obtained therefrom will be described.

The antenna device 1 described in the above embodiment and in the modified example thereof includes the circuit substrate (antenna substrate) 20 and the antenna element that is connected to the circuit substrate 20.

The antenna element 30 has the antenna unit 31 that is arranged at the position separated by the predetermined length H from the substrate surface 20*a* in the first direction (up-down direction: Z-direction) that is the direction perpendicular to the substrate surface of the circuit substrate 20, in such a way as to be parallel to the substrate surface 20*a* of the circuit substrate 20. Further, the antenna element 30 has the grounding unit 32 that is connected continuous to the antenna unit 31 and grounded to the circuit substrate 20, and the feeding unit 33 that is connected continuous to the antenna unit 31 and feeds power to the antenna unit 31.

In addition, the grounding unit 32 is provided with the grounding body 321 that is connected continuous to the antenna unit 31 on one side in the first direction (upper side in the up-down direction), and the mounting unit 322 that is connected continuous to the other side of the grounding body 321 in the first direction (lower side in the up-down direction) and mounted on the circuit substrate 20.

In addition, the mounting unit 322 is provided with the plurality of mounting pieces 3221 that are spaced along the second direction intersecting the first direction (the longitudinal direction of the antenna device: the X-direction).

Accordingly, in the antenna device 1 described in the above embodiment and in the modified example thereof, the plurality of mounting pieces 3221 which are connected continuous to the other side of the grounding body 321 in the first direction and spaced along the second direction are mounted on the circuit substrate (antenna substrate) 20.

Thus, when the grounding unit 32 is mounted on the circuit substrate 20 by soldering, it is possible to suppress diffusion of the heat of the solder over the whole antenna element and reduce the time that is required to mount the grounding unit 32 on the circuit substrate 20. As a result, it is possible to mount the grounding unit 32 on the circuit substrate (antenna substrate) 20 more easily.

At this time, since three mounting pieces 3221 that are connected continuous to the other side of the grounding body 321 in the first direction are mounted on the circuit substrate it is possible to reduce the influence of the grounding unit 32 that is caused by a change in shape of the grounding unit 32 on the antenna characteristics of the antenna unit 31. That is, it is possible to suppress degradation in the antenna characteristics of the antenna unit 31 as much as possible.

Therefore, the antenna device 1 described in the above embodiment and in the modified example thereof makes it possible to obtain the desired antenna characteristics in the antenna unit 31 and mount the grounding unit 32 on the circuit substrate 20 more easily.

In addition, the narrow part 3211 having a short length in the second direction (the longitudinal direction of the antenna device: the X-direction) may be formed in a portion of the grounding body 321 in the first direction (the up-down direction: the Z-direction).

Thus, when the grounding unit 32 is mounted on the circuit substrate 20 by soldering, it is possible to more reliably suppress diffusion of the heat of the solder over the whole antenna element 30, and further reduce the time that is required to mount the grounding unit 32 on the circuit substrate 20.

In addition, the narrow part 3211 may be formed by forming the slits 3212 extending in the second direction (the longitudinal direction of the antenna device: the X-direction) in a portion of the grounding body 321 in the first direction (the up-down direction: the Z-direction).

This makes it possible to adjust the antenna characteristics of the antenna unit 31 and the time that is required for solder mounting simply by adjusting the size of the slits 3212 (the vertical width and horizontal length). That is, this makes it possible to more easily adjust the antenna characteristics of the antenna unit 31 and the time that is required to mount the grounding unit 32 on the circuit substrate 20 by soldering. As a result, it becomes possible to easily manufacture the antenna device 1 with which it is possible to obtain the desired antenna characteristics in the antenna unit and reduce the time that is required to mount the grounding unit 32 on the circuit board (antenna substrate) 20.

[Other Matters]

Although the present embodiment has been described as above, the present embodiment is not limited to these configurations and various modifications are possible within the scope of the gist of the present embodiment.

For example, the configurations described in the above embodiment and in the modified example thereof may be combined as appropriate.

In the above embodiment and in the modified example thereof, a description has been given regarding a composite antenna device which is composed of a plurality of antennas compatible with different communication methods as an example of the antenna device 1. However, the antenna device 1 does not need to be a composite antenna device, and the present invention may be applied to various antenna devices. For example, the present invention may be applied to an antenna device in which only a pair of antenna elements 30 are connected to the circuit substrate 20.

Further, in the modified example of the above embodiment, a description has been given regarding an example in which the slits 3212 having an approximately rectangular shape when viewed along the Y-direction are provided in the grounding body 321; however, the present invention is not limited to this configuration, and slits having various shapes such as triangular or semicircular shapes may be provided in the grounding body 321.

Further, in the modified example of the above embodiment, a description has been given regarding an example in which the slits 3212 are formed on both sides of the grounding body 321 in the X-direction, but a slit may be provided only on one side of the grounding body 321 in the X-direction.

Further, in the modified example of the above embodiment, a description has been given regarding an example in which the slits 3212 which are open in the X-direction are formed in the grounding body 321, but slits which are open in the Z-direction may be formed in the grounding body 321. For example, slits which are open on the other side in the Z-direction (lower side in the up-down direction) and elongated in the Z-direction may be provided up to the middle of the grounding body 321 (the central part in the up-down direction, or the like). This also makes it possible to form the narrow part 3211 having a short length in the second direction (longitudinal direction of the antenna device: X-direction) in a portion of the grounding body 321 in the first direction (the up-down direction: Z-direction).

In addition, slits having the above-described shapes combined as appropriate may be formed in the grounding body 321, or a plurality of slits having different shapes may be formed in the grounding body 321 (a plurality types of slits being formed in the grounding body 321).

Further, the present invention may be applied to antenna devices other than an in-vehicle antenna device that is installed in a vehicle. For example, the present invention may be applied to antenna devices mounted in a mobile body such as an aircraft or a ship, and the present invention may also be applied to antenna devices mounted in a device or the like in which vibrations occur despite not being a device for moving.

In addition, the specifications (shape, size, layout, etc.) of the feeding units, antenna elements, and other particulars may also be changed as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An antenna device comprising:

an antenna substrate; and an antenna element that is connected to the antenna substrate, wherein the antenna element includes:

an antenna unit that is arranged at a position separated by a predetermined length from a substrate surface of the antenna substrate in a first direction that is a direction perpendicular to the substrate surface of the antenna substrate, in such a way as to be parallel to the substrate surface of the antenna substrate;

a grounding unit that is connected continuous to the antenna unit and grounded to the antenna substrate; and a feeding unit that is connected continuous to the antenna unit and feeds power to the antenna unit, the grounding unit is provided with a grounding body that is connected continuous to the antenna unit on one side in the first direction, and a mounting unit that is connected continuous to another side of the grounding body in the first direction and mounted on the antenna substrate, and the mounting unit is provided with a plurality of mounting pieces that are spaced apart along a second direction intersecting the first direction, wherein the grounding unit includes a plurality of directly opposing slits provided therein that extend in the second direction to define a narrow portion of the grounding body disposed between the plurality of directly opposing slits and a wide portion of the grounding body at opposing sides of the plurality of directly opposing slits in the first direction.

* * * * *